(12) United States Patent
Wang et al.

(10) Patent No.: US 11,412,393 B2
(45) Date of Patent: Aug. 9, 2022

(54) METHOD AND DEVICE FOR DETERMINING TRANSMISSION DIRECTION

(71) Applicant: HUAWEI TECHNOLOGIES CO., LTD., Guangdong (CN)

(72) Inventors: Yafei Wang, Shanghai (CN); Chi Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 16/714,242

(22) Filed: Dec. 13, 2019

(65) Prior Publication Data

US 2020/0120514 A1 Apr. 16, 2020

Related U.S. Application Data

(63) Continuation of application No. PCT/CN2018/091001, filed on Jun. 13, 2018.

(30) Foreign Application Priority Data

Jun. 16, 2017 (CN) .......................... 201710459497.7

(51) Int. Cl.
*H04L 5/14* (2006.01)
*H04W 16/28* (2009.01)
(Continued)

(52) U.S. Cl.
CPC ........... *H04W 16/28* (2013.01); *H04L 5/0094* (2013.01); *H04W 72/0446* (2013.01); *H04W 72/0453* (2013.01)

(58) Field of Classification Search
CPC ............ H04L 5/0094; H04W 72/0446; H04W 72/0453
See application file for complete search history.

(56) References Cited

U.S. PATENT DOCUMENTS

2015/0358964 A1 12/2015 Tiirola et al.
2017/0077985 A1 3/2017 Li et al.
(Continued)

FOREIGN PATENT DOCUMENTS

CN 104811411 A 7/2015
CN 104969504 A 10/2015
(Continued)

OTHER PUBLICATIONS

Shaozhen Guo et al., 'Dynamic TDD and Interference Management towards 5G', 2018 IEEE Wireless Communications and Networking Conference, pp. 1-6. (Year: 2018).*
(Continued)

*Primary Examiner* — Melvin C Marcelo
(74) *Attorney, Agent, or Firm* — Fish & Richardson P.C.

(57) ABSTRACT

This application provides example methods and devices for determining a transmission direction. One example method includes receiving, by a terminal device, first indication information from a network device, where the first indication information is used to indicate a transmission direction in a first time element, where the first time element is located on a first resource, and where a frequency domain resource of the first resource is a first frequency domain resource. The terminal device can then determine a transmission direction in a second time element based on the transmission direction in the first time element, where the second time element is located on a second resource, where a frequency domain resource of the second resource is a second frequency domain resource, where the first frequency domain resource and the second frequency domain resource use different configuration parameters.

20 Claims, 9 Drawing Sheets

(51) Int. Cl.
*H04L 5/00* (2006.01)
*H04W 72/04* (2009.01)

(56) References Cited

U.S. PATENT DOCUMENTS

2018/0152276 A1   5/2018   Hu et al.
2019/0268902 A1*  8/2019   Sun .................. H04L 27/2607

FOREIGN PATENT DOCUMENTS

| CN | 105099633 A | 11/2015 |
| CN | 105553605 A | 5/2016 |
| CN | 105657850 A | 6/2016 |
| CN | 106452711 A | 2/2017 |
| CN | 106688214 B | 10/2019 |
| WO | 2015160184 A1 | 10/2015 |
| WO | 2015176293 A1 | 11/2015 |
| WO | 2016085380 A1 | 6/2016 |
| WO | WO-2017213433 A1 * | 12/2017 ......... H04L 27/2607 |

OTHER PUBLICATIONS

Extended European Search Report issued in European Application No. 18817880.0 dated May 8, 2020, 8 pages.
Office Action issued in Chinese Application No. 201710459497.7 dated Aug. 5, 2020, 27 pages (with English translation).
Office Action issued in Chinese Application No. 201710459497.7 dated Jan. 3, 2020, 25 pages (with English translation).
PCT International Search Report and Written Opinion issued in International Application No. PCT/CN2018/091001 dated Sep. 5, 2018, 17 pages (with English translation).
Zhang et al., "Filtered-OFDM-Enabler for Flexible Waveform in the 5th Generation Cellular Networks," 2015 IEEE Global Communications Conference (GLOBECOM), Dec. 2015, 6 pages.

* cited by examiner

METHOD AND DEVICE FOR DETERMINING TRANSMISSION DIRECTION

CROSS-REFERENCE TO RELATED APPLICATIONS

This application is a continuation of International Application No. PCT/CN2018/091001, filed on Jun. 13, 2018, which claims priority to Chinese Patent Application No. 201710459497.7, filed on Jun. 16, 2017. The disclosures of the aforementioned applications are hereby incorporated by reference in their entireties.

TECHNICAL FIELD

This application relates to the communications field, and more specifically, to a method and device for determining a transmission direction.

BACKGROUND

A long term evolution (long term evolution, LTE) system supports two duplex modes, that is, frequency division duplex (frequency division duplex, FDD) and time division duplex (time division duplex, TDD). Compared with FDD, TDD does not need spectrum resources in pairs, and can provide a more flexible system configuration. Currently, an LTE-TDD system provides seven different subframe configurations for a terminal device and a network device to perform uplink and downlink data transmission.

To reduce interference between different cells, different network devices use a same subframe configuration in one time segment to perform data transmission with the terminal device. In such a mode, an actual requirement of a service volume of each network device cannot be met efficiently. Therefore, a new duplex technology is introduced: Uplink and downlink transmission in each cell may be separately configured based on an actual service requirement. Usually, such a duplex technology is referred to as a flexible duplex technology.

In the flexible duplex technology, the terminal device may transmit data by using two resources corresponding to different frequency domain resources. In this case, the terminal device needs to learn of a transmission direction in a time element on each of the two resources. Therefore, how the terminal device determines the transmission direction in the time element on each of the two resources becomes an urgent technical problem to be resolved.

SUMMARY

This application provides a method for determining a transmission direction, so that a terminal device can determine a transmission direction in a time element on each of two resources.

According to a first aspect, a method for determining a transmission direction is provided. The method includes: receiving, by a terminal device, first indication information from a network device, where the first indication information is used to indicate a transmission direction in a first time element, the first time element is located on a first resource, and a frequency domain resource of the first resource is a first frequency domain resource; and determining, by the terminal device, a transmission direction in a second time element based on the transmission direction in the first time element, where the second time element is located on a second resource, and a frequency domain resource of the second resource is a second frequency domain resource, where the first frequency domain resource and the second frequency domain resource use different configuration parameters.

According to this embodiment of this application, the terminal device can determine a transmission direction in a time element on each of two resources, so that the terminal device can transmit data to the network device by using the two resources. Further, the first indication information indicates a transmission direction in a time element on a resource, so that the terminal device can determine, based on the transmission direction in the first time element on the resource, the transmission direction in the second time element on another resource. This method helps reduce signaling overheads.

Optionally, in a possible implementation, the first indication information is specifically used to indicate the transmission direction in the first time element in a first time segment, the first time segment includes a plurality of time elements, and the first time element is a time element that is in the plurality of time elements and in which a transmission direction is specified.

Optionally, in a possible implementation, the determining, by the terminal device, a transmission direction in a second time element based on the transmission direction in the first time element includes: determining, by the terminal device, the second time element based on a location of the first time element in time domain; and determining, by the terminal device, the transmission direction in the second time element based on the transmission direction in the first time element, where the second time element is a time element in which a transmission direction is limited.

In a possible implementation, a subcarrier spacing of the first frequency domain resource is less than a subcarrier spacing of the second frequency domain resource, one first time element corresponds to N second time elements, where N is an integer greater than 1; and the determining, by the terminal device, a transmission direction in a second time element based on the transmission direction in the first time element includes: when the transmission direction in the first time element is uplink, determining, by the terminal device, that a transmission direction in the N second time elements is a non-downlink transmission direction; or when the transmission direction in the first time element is downlink, determining, by the terminal device, that a transmission direction in the N second time elements is a non-uplink transmission direction.

In a possible implementation, that one first time element corresponds to N second time elements includes: in time domain, the first time element is aligned with the N consecutive second time elements.

In a possible implementation, a subcarrier spacing of the first frequency domain resource is greater than a subcarrier spacing of the second frequency domain resource, and one first time element corresponds to time subelements included in one second time element; and the determining, by the terminal device, a transmission direction in a second time element based on the transmission direction in the first time element includes: when the transmission direction in the first time element is uplink, determining, by the terminal, that a transmission direction in the time subelements included in the second time element is a non-downlink transmission direction; or when the transmission direction in the first time element is downlink, determining, by the terminal device, that a transmission direction in the time subelements included in the second time element is a non-uplink transmission direction.

In a possible implementation, that one first time element corresponds to time subelements included in one second time element includes: in time domain, the first time element is aligned with the time subelements included in the second time element.

In a possible implementation, the method further includes: determining, by the terminal device based on second indication information or a predefined agreement, that the first time element is a reference time element of the second time element, where the second indication information is sent by the network device.

According to a second aspect, a method for determining a transmission direction is provided. The method includes: determining, by a network device, a transmission direction in a first time element and a transmission direction in a second time element, where the first time element is located on a first resource, a frequency domain resource of the first resource is a first frequency domain resource, the second time element is located on a second resource, and a frequency domain resource of the second resource is a second frequency domain resource, and sending, by the network device, first indication information to a terminal device, where the first indication information is used to indicate the transmission direction in the first time element, where the first frequency domain resource and the second frequency domain resource use different configuration parameters.

In this embodiment of this application, the network device indicates, to the terminal device, a transmission direction in a time element on a resource, so that the terminal device can determine a transmission direction in a time element in each of at least two resources, and the terminal device and the network device transmit data by using the at least two resources. Further, this solution helps reduce signaling overheads.

Optionally, in a possible implementation, the transmission direction in the first time element is used by the terminal device to determine the transmission direction in the second time element.

In a possible implementation, a subcarrier spacing of the first frequency domain resource is less than a subcarrier spacing of the second frequency domain resource, one first time element corresponds to N second time elements, where N is an integer greater than 1; and when the transmission direction in the first time element is uplink, a transmission direction in the N second time elements is a non-downlink transmission direction; or when the transmission direction in the first time element is downlink, a transmission direction in the N second time elements is a non-uplink transmission direction.

In a possible implementation, that one first time element corresponds to N second time elements includes: in time domain, the first time element is aligned with the N consecutive second time elements.

In a possible implementation, a subcarrier spacing of the first frequency domain resource is greater than a subcarrier spacing of the second frequency domain resource, and one first time element corresponds to time subelements included in one second time element; and when the transmission direction in the first time element is uplink, a transmission direction in the time subelements included in the second time element is a non-downlink transmission direction; or when the transmission direction in the first time element is downlink, a transmission direction in the time subelements included in the second time element is a non-uplink transmission direction.

In a possible implementation, that one first time element corresponds to time subelements included in one second time element includes: in time domain, the first time element is aligned with the time subelements included in the second time element.

In a possible implementation, the method further includes: sending, by the network device, second indication information, where the second indication information is used to indicate that the first time element is a reference time element of the second time element.

With reference to any aspect or any possible implementation of the aspects, the configuration parameter includes a subcarrier spacing; and a subcarrier spacing of the first frequency domain resource is less than a subcarrier spacing of the second frequency domain resource; or a subcarrier spacing of the first frequency domain resource is greater than a subcarrier spacing of the second frequency domain resource.

With reference to any aspect or any possible implementation of the aspects, $N=2^k$, the subcarrier spacing of the second frequency domain resource is $2^k$ times the subcarrier spacing of the first frequency domain resource, the first time element is numbered m in time domain, and a transmission direction in at least one of the $2^k$ second time elements numbered $2^k \cdot m, \ldots,$ and $(2^k \cdot m + 2^k - 1)$ is the same as the transmission direction in the first time element numbered m, where m is an integer greater than or equal to 0, and k is an integer greater than or equal to 1.

With reference to any aspect or any possible implementation of the aspects, the first frequency domain resource and the second frequency domain resource are located on different bandwidth parts BP, or located on different carriers in intra-band carrier aggregation CA.

Optionally, with reference to any aspect or any possible implementation of the aspects, the subcarrier spacing of the first frequency domain resource is a first subcarrier spacing, and the first subcarrier spacing is a minimum subcarrier spacing in at least two subcarrier spacings configured for the terminal device; or the first subcarrier spacing is a maximum subcarrier spacing in at least two subcarrier spacings configured for the terminal device; or the first frequency domain resource is a frequency domain resource that has a minimum subcarrier spacing and that is in at least two frequency domain resources configured for the terminal device; or the first frequency domain resource is a frequency domain resource that has a maximum subcarrier spacing and that is in at least two frequency domain resources configured for the terminal device.

According to a third aspect, a communications device is provided. The communications device includes various units configured to perform any one of the first aspect or the possible implementations of the first aspect, and the communications device may be a terminal device or a baseband chip.

According to a fourth aspect, a communications device is provided. The communications device includes various units configured to perform any one of the second aspect or the possible implementations of the second aspect, and the communications device may be a network device or a baseband chip.

According to a fifth aspect, a communications device is provided. The communications device includes a transceiver component and a processor, so that the communications device performs the method according to any one of the first aspect or the possible implementations of the first aspect. The communications device may be a terminal device or a baseband chip. If the communications device is a terminal device, the transceiver component may be a transceiver, or if the communications device is a baseband chip, the transceiver component ma) be an input/output circuit of the baseband chip.

According to a sixth aspect, a communications device is provided. The communications device includes a transceiver component and a processor, so that the communications device performs the method according to any one of the second aspect or the possible implementations of the second aspect. The communications device may be a network device or a baseband chip. If the communications device is a network device, the transceiver component may be a transceiver, or if the communications device is a baseband chip, the transceiver component may be an input/output circuit of the baseband chip.

According to a seventh aspect, a computer program product is provided. The computer program product includes computer program code, and the computer program code, when run on a terminal device, enables the terminal device to perform the method according to any one of the first aspect or the possible implementations of the first aspect.

According to an eighth aspect, a computer program product is provided. The computer program product includes computer program code, and the computer program code, when run on a terminal device, enables the network device to perform the method according to any one of the second aspect or the possible implementations of the second aspect.

According to a ninth aspect, a computer readable medium is provided. The computer readable medium stores program code, and the program code includes an instruction used to perform the method according to any one of the first aspect or the possible implementations of the first aspect.

According to a tenth aspect, a computer readable medium is provided. The computer readable medium stores program code, and the program code includes an instruction used to perform the method according to any one of the second aspect or the possible implementations of the second aspect.

In this application, by receiving indication information sent by the network device, the terminal device can determine a transmission direction in a time element on two resources, so that the terminal device can transmit data to the network device by using the two resources. Further, the indication information indicates a transmission direction in a time element on a resource, so that the terminal device can determine, based on the transmission direction in the time element on the resource, a transmission direction in a time element on another resource. This solution can reduce signaling overheads.

DESCRIPTION OF EMBODIMENTS

Figure 1:
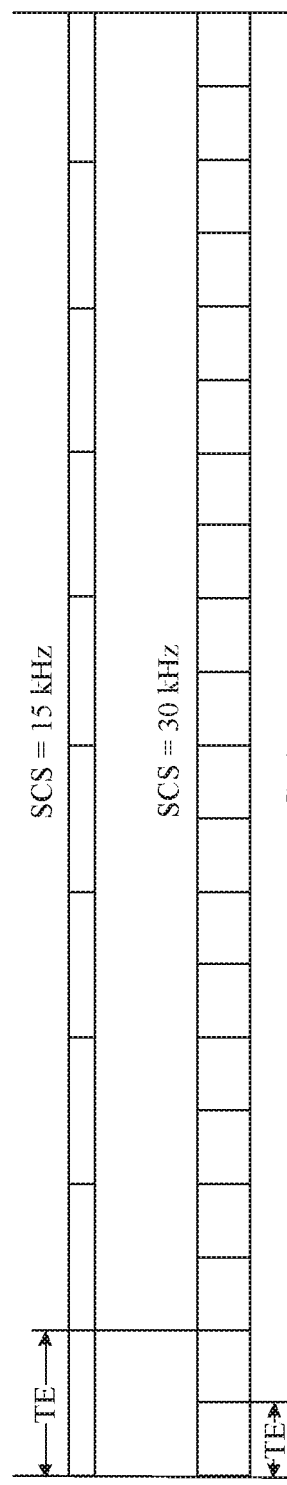
FIG. 1 is a schematic diagram of time elements having different subcarrier spacings.

The following describes the technical solutions in this application with reference to the accompanying drawings.

It should be understood that, division of manners, cases, and types in the embodiments of this application is merely for the convenience of description, and should not constitute a particular limitation. Features in the various manners, types, and cases may be combined with each other if no conflict occurs.

It should be further understood that, "first", "second", and "third" in the embodiments of this application are merely used for distinguishing, and should not constitute any limitation on this application.

Methods in the embodiments of this application may be applied to a long term evolution technology (long term evolution, LTE) system, a long term evolution-advanced technology (long term evolution-advanced, LTE-A) system, an enhanced long term evolution technology (enhanced long term evolution-advanced, eLTE), or a new radio (new radio, NR) communications system, or may be extended to a similar wireless communications system, for example, wireless fidelity (wireless-fidelity, WiFi), worldwide interoperability for microwave access (worldwide interoperability for microwave access, WIMAX), and a cellular system related to the 3rd generation partnership project (3rd generation partnership project, 3GPP).

In the embodiments of this application, a network device is an apparatus that is deployed in a radio access network and that is configured to provide a radio communication function for a terminal device. The network device may include different types of base stations, macro base stations, micro base stations (or referred to as small cells), relay stations, and access points. In systems using different radio access technologies, names of devices having functions of the base station may vary. For example, the network device may be an access point (Access Point, AP) in a wireless local area network (Wireless Local Area Networks, WLAN) or may be a base transceiver station (Base Transceiver Station, BTS) in global system for mobile communications (Global System For Mobile Communication, GSM) or code division multiple access (Code Division Multiple Access. CDMA).

The network device may further be an evolved NodeB (evolved NodeB, eNB or eNodeB) in an LTE system. Alternatively, the network device may further be a NodeB (Node B) in a 3rd Generation (3rd Generation, 3G) system. Additionally, the network side device may further be a relay station, an access point, an in-vehicle device, a wearable device, a network device in a future 5G Generation communication (fifth-generation, 5G) network, a network device in a future evolved public land mobile network (Public Land Mobile Network, PLMN) network, or the like.

The terminal device in the embodiments of this application may alternatively be referred to as user equipment (user equipment, UE), an access terminal, a terminal device unit (subscriber unit), a terminal device station, a mobile console, a mobile station (mobile station, MS), a remote station, a remote terminal, a mobile device, a user terminal, a terminal (terminal), a wireless communication device, a terminal device agent, or a terminal device. The terminal device may include various handheld devices, in-vehicle devices, wearable devices, or computing devices that have a wireless communication function, or other processing devices connected to a wireless modem. The terminal device may further include a user unit, a cellular phone (cellular phone), a smartphone (smart phone), a wireless data card, a personal digital assistant (personal digital assistant. PDA) computer, a tablet computer, a wireless modem (modem), a handheld device (handset), a laptop computer (laptop computer), a machine type communication (machine type Communication, MTC) terminal, or a station (station, ST) in a wireless local area network (Wireless Local Area Networks. WLAN). The terminal device may be a cellular phone, a cordless telephone, a session initiation protocol (Session Initiation Protocol, SIP) telephone, a wireless local loop (wireless local loop, WLL) station and a next-generation communications system, for example, a terminal device in a 5G network, or a terminal device in a future evolved PLMN network.

For ease of understanding the embodiments of this application, first, concepts used in the embodiments of this application are briefly introduced.

Time element: In the embodiments of this application, a time element is a length of a period of time. For example, the time element may be a subframe (subframe), a slot (slot), a mini-slot (mini-slot), or a symbol. The time element may alternatively be a plurality of subframes, a plurality of slots, a plurality of mini-slots, or a plurality of symbols. Further, the time element may be a time element used to schedule a transport block in a communications system. For example, the time element may be a transmission time interval (transmission time interval, TTI).

Bandwidth part (bandwidth part. BP): In the embodiments of this application, a BP may be a segment of contiguous resources in frequency domain. For example, a bandwidth part includes K (K>0) contiguous subcarriers; a bandwidth part is a frequency domain resource on which K (K>0) non-overlapping contiguous resource blocks (resource block, RB) are located; or a bandwidth part is a frequency domain resource on which M (M>0) non-overlapping contiguous resource block groups (resource block group, RBG) are located. An RBG includes P (P>0) contiguous RBs. A BP is related to a particular configuration parameter. The configuration parameter may be numerology, including a subcarrier spacing (subcarrier space. SCS) and a cyclic prefix (cyclic prefix, CP).

Transmission direction: In the embodiments of this application, a transmission direction includes at least uplink transmission and downlink transmission. The transmission direction may further include at least one of empty, unknown, and reserved. The transmission direction being uplink transmission means that a terminal device sends data to a network device. The transmission direction being downlink transmission means that a network device transmits data to a terminal device. The transmission direction being empty may be understood as that: data is not transmitted. For example, assuming that a transmission direction in a subframe #1 is empty, it may be understood that data is not transmitted in the subframe #1, the subframe #1 is a vacant resource, and the vacant resource may be used for interference measurement, for example, may be used for cross interference link measurement. The transmission direction being unknown/reserved may be understood as unknown, mainly for consideration of forward compatibility. For example, a subframe or a slot in which a transmission direction is unknown/reserved may be used for device-to-device (Device-to-Device, D2D) communication, measurement, or the like. The transmission direction being non-uplink transmission may be understood as that: the transmission direction is downlink transmission, empty, unknown, or reserved. The transmission direction being non-downlink transmission may be understood as that: the transmission direction is uplink transmission, empty, unknown, or reserved.

Relationship Between a Subcarrier Spacing and a Time Length of a Symbol:

A subcarrier spacing is inversely proportional to a time length of a symbol, to be specific, a larger subcarrier spacing indicates a shorter time length of a symbol. In other words, if a subcarrier spacing #1 is Z times a subcarrier spacing #2, a time length of a symbol of the subcarrier spacing #1 is 1/Z of a time length of a symbol of the subcarrier spacing #2. It can be learned from the foregoing description that, the time element in the embodiments of this application may include a plurality of symbols. Assuming that a subcarrier spacing corresponding to a time element #A is Z times a subcarrier spacing corresponding to a time element #B, and the time element #A includes a same quantity of symbols as the time element #B, a time length of the time element #B is 1/Z of a time length of the time element #A. The time element #B may include Z time elements #A in time domain. For ease of description, in the accompanying drawings of this specification, the time element is denoted as a "time element, TE".

FIG. 1 is a schematic diagram of time elements having different subcarrier spacings. As shown in FIG. 1, it is assumed that different time elements have a same quantity of symbols, and a time length of a time element whose subcarrier spacing is 15 kHz (kHz) is twice a time length of a time element whose subcarrier spacing is 30 kHz. The time element whose subcarrier spacing is 15 kHz is equal to two time elements whose subcarrier spacing is 30 kHz in time domain.

A flexible duplex technology includes an unpaired (unpaired) flexible duplex technology and a paired (paired) flexible duplex technology. The unpaired flexible duplex technology may also be referred to as a flexible TDD. The unpaired flexible duplex technology means that a DL and a UL are located in a same frequency band, and a direction in each time element may dynamically change. For example, the unpaired flexible duplex technology supports a transmission direction in a time element at a granularity of a subframe and a slot in a dynamic change. The paired flexible duplex technology means that downlink data may be sent in some time elements in an uplink frequency band, and uplink data may be sent in some time elements in a downlink frequency band.

In other words, in the flexible duplex technology, a network device and a terminal device may use a time element for uplink transmission or downlink transmission based on an actual requirement. In other words, in a system, there is a time element in which a transmission direction dynamically changes.

The time element in which a transmission direction dynamically changes may be referred to as a "flexible time element". The transmission direction in the flexible time element is not fixed. For example, uplink transmission or downlink transmission may be performed in the flexible time element based on an actual case.

Further, in addition to the time element in which a transmission direction dynamically changes, in the system, some time elements in which a transmission direction is specified (time elements in which a transmission direction is fixed) may further be defined or configured to transmit a particular signal or channel.

For example, some downlink time elements need to be defined or configured to transmit broadcast information (broadcast information), a synchronization signal block (synchronization signal block, SS block), a channel state information-reference signal (channel state information reference signal, CSI-RS), radio resource management (radio resource management, RRM) information, and the like.

For another example, some uplink time elements need to be defined or configured to transmit a physical random access channel (physical random access channel, PRACH), a scheduling request (scheduling request, SR) resource, a channel state information feedback (CSI feedback) cycle, and the like.

There may be a variety of time elements in which a transmission direction is specified. For example, a resource element in which a transmission direction is uplink transmission may be referred to as "a fixed uplink (fixed uplink, fixed UL) time element", and a resource element in which a transmission direction is downlink transmission may be referred to as "a fixed downlink (fixed downlink, fixed DL) time element". For ease of description, the fixed UL time element and the fixed DL time element may be collectively referred to as a fixed time element.

Further, the network device and the terminal device may transmit data by using at least two frequency domain resources.

For example, in a discussion on NR bandwidth (wideband), a maximum carrier bandwidth supports 400 MHz, but the terminal device cannot support the entire bandwidth, and therefore, the bandwidth needs to be divided into a plurality of BPs. Different BPs may have different configuration parameters, and the terminal device may transmit data by using at least two of the plurality of BPs.

For another example, the terminal device may transmit data by using at least two carriers in intra-band carrier aggregation (carrier aggregation, CA).

Further, at least two frequency domain resources are in a one-to-one correspondence to at least two resources. For example, a first frequency domain resource corresponds to a first resource, and a frequency domain resource of the first resource is the first frequency domain resource.

The terminal device needs to determine a transmission direction in a time element on each of the two resources. For example, the terminal device needs to learn of a location of a fixed time element on each resource and a transmission direction in the fixed time element.

Based on this, how the terminal device determines the transmission direction in the time element on each of the at least two resources (for example, how the terminal device determines the location of the fixed time element on each resource and the transmission direction in the fixed time element) becomes an urgent technical problem to be resolved.

Figure 2:
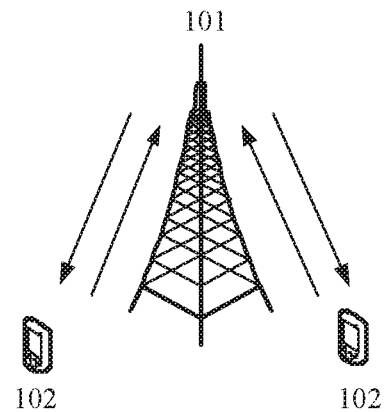
FIG. 2 is a schematic diagram of an application scenario to which an embodiment of this application is applicable.

FIG. 2 is a diagram of an application scenario to which an embodiment of this application is applicable. As shown in FIG. 2, the application scenario includes a network device 101, and the application scenario further includes a plurality of terminal devices 102 located within coverage of the network device 101. The network device 101 may communicate with the terminal devices 102. It should be understood that, only two terminal devices 102 within the coverage of the network device 101 are described as an example in FIG. 2. Apparently, there may be more terminal devices 102 within the coverage of the network device 101.

A method for determining a transmission direction in the embodiments of this application is described in detail below with reference to FIG. 3 to FIG. 7.

Figure 3:
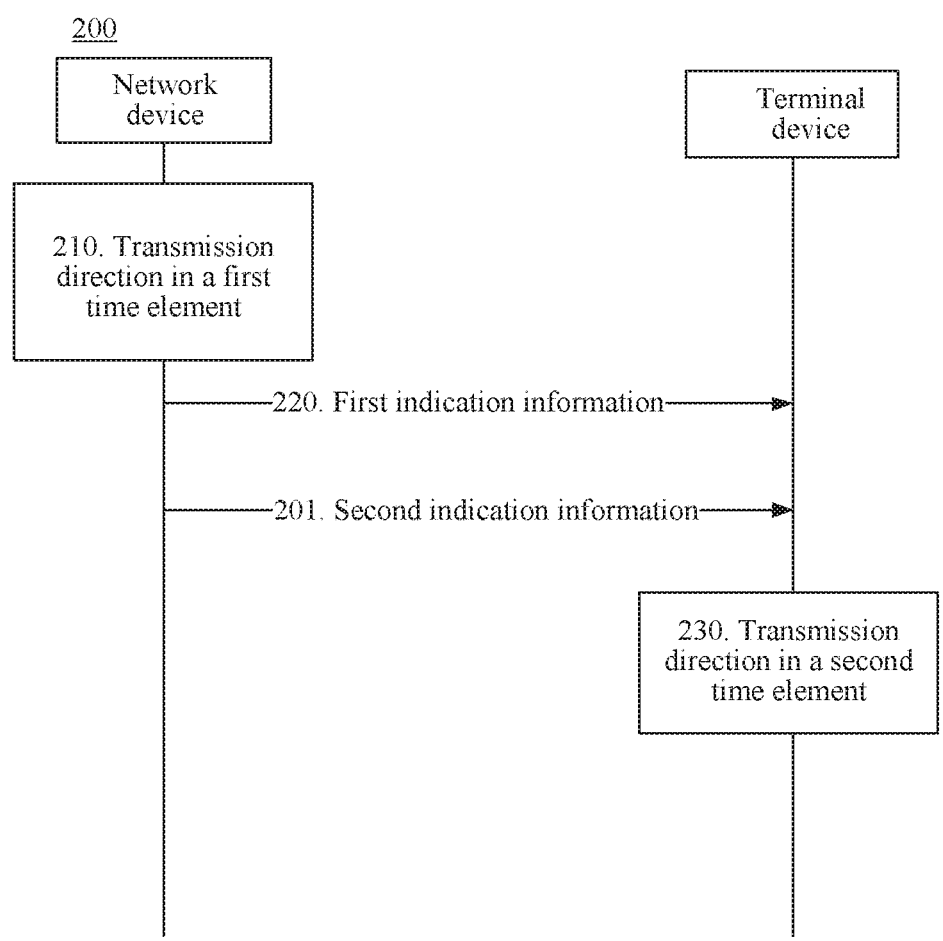
FIG. 3 is a schematic interaction diagram of an example of a method for determining a transmission direction according to an embodiment of this application.

FIG. 3 is a schematic interaction diagram of an example of the method for determining a transmission direction according to an embodiment of this application. It should be understood that, FIG. 3 shows detailed steps or operations of the method 200, but the steps or operations are merely examples. In this embodiment of this application, another operation may further be performed, or only some operations in FIG. 3 are performed.

The method 200 may be performed by a network device and a terminal device. The network device and the terminal device may correspond to the network device 101 and the terminal device 102 respectively in the foregoing communication scenario. As shown in FIG. 3, the method 200 may include 210, 220, and 230.

210. The network device determines a transmission direction in a first time element and a transmission direction in a second time element, where the first time element is located on a first resource, a frequency domain resource of the first resource is a first frequency domain resource, the second time element is located on a second resource, and a frequency domain resource of the second resource is a second frequency domain resource.

The first frequency domain resource and the second frequency domain resource may have a same configuration parameter or different configuration parameters, the first time element is located on the first resource, and the frequency domain resource of the first resource is the first frequency domain resource. The first time element may be the fixed time element in the foregoing description.

In an optional example, step 210 may include:

determining, by the network device, the transmission direction in the first time element in a first time segment, where the first time segment includes a plurality of time elements, and each of the plurality of time elements are located on the first resource.

Specifically, some time elements in the plurality of time elements are first time elements, in other words, a transmission direction in some time elements is fixed (that is, a transmission direction in some time elements is specified, for example, as DL or UL). In time elements (that is, flexible time elements) other than the first time elements in the plurality of time elements, a transmission direction is not fixed. The network device may determine the transmission direction in the flexible time elements based on an actual transmission status.

Figure 4:
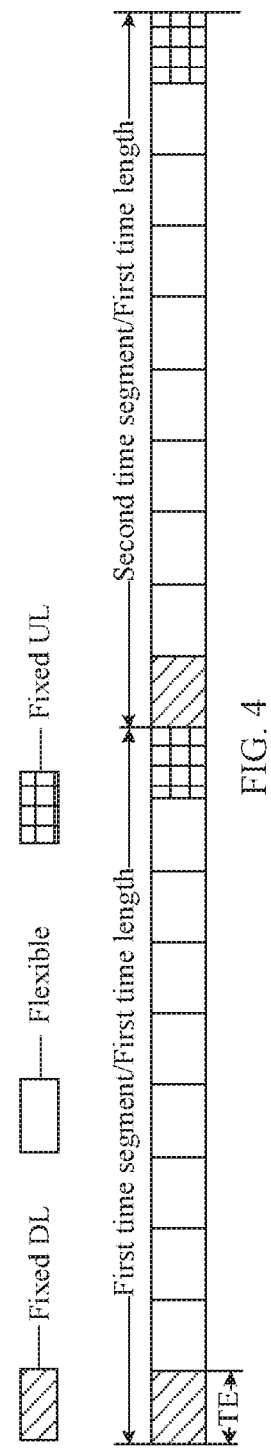
FIG. 4 is a schematic diagram of an example of a plurality of time elements in a first time segment according to an embodiment of this application.

FIG. 4 is a schematic diagram of an example of the plurality of time elements in the first time segment according to an embodiment of this application. As shown in FIG. 4, the plurality of time elements include two first time elements, and the two first time elements are a first time element in the first time segment and a last time element in the first time segment. Transmission directions in the two first time elements are downlink transmission and uplink transmission.

Optionally, a time length of the first time segment is a first time length, and the first time length may be a transmission period. The transmission period may be understood as a time interval at which a pattern (pattern) of a fixed time element repeatedly occurs. In other words, in each transmission period, the first time element has a same location and transmission direction, in other words, locations and transmission directions of the first time element in different transmission periods are consistent. FIG. 4 is still used as an example. The first time length is a transmission period, and locations and transmission directions of the first time element in a second time segment and the first time segment are the same, to be specific, patterns of the fixed time element are the same.

220. The network device sends first indication information, and correspondingly, the terminal device receives the first indication information, where the first indication information is used to indicate the transmission direction in the first time element.

Optionally, the network device may send the first indication information through higher layer signaling. The higher layer signaling may include, radio resource control (radio resource control, RRC) signaling, a media access control (medium access control, MAC) control unit (control element, CE), a system message (master system information block (master information block, MIB), a system information block (system information block, SIB)), and the like. Further, the network device may semi-configure the transmission direction in the first time element through the higher layer signaling. Correspondingly, the terminal device may receive the first indication information from the network device, and determine the transmission direction in the first time element based on the first indication information.

The transmission direction in the first time element is used by the terminal device to determine the transmission direction in the second time element.

230. The terminal device determines the transmission direction in the second time element based on the transmission direction in the first time element, where the second time element corresponds to the second frequency domain resource.

The first time element and the second time element partially or entirely overlap in time domain.

Optionally, the first frequency domain resource and the second frequency domain resource in this embodiment of this application may be located on different BPs, or located on different carriers in intra-band carrier aggregation (carrier aggregation, CA). In this embodiment of this application, configuration parameters of the first frequency domain resource and the second frequency domain resource may be the same or different. For example, subcarrier spacings of the first frequency domain resource and the second frequency domain resource may be the same or different.

Optionally, the first time element is a fixed time element, and step 230 may include: determining, by the terminal device, the second time element based on the first time element (a location of the first time element in time domain), where the second time element is a time element in which a transmission direction is limited (that is, the second time element is a non-flexible time element). Specifically, the terminal device may determine that a time element that at least partially overlaps the first time element in time domain and that is located on a second resource is the second time element, and the terminal device determines the transmission direction in the second time element based on the transmission direction in the first time element.

Specifically, the terminal device may determine the transmission direction in the second time element based on the transmission direction in the first time element according to a principle that downlink transmission and uplink transmission in a time domain resource on a same carrier or in a same frequency band do not conflict with each other. A transmission direction conflict means a conflict between the uplink transmission and the downlink transmission.

In other words, assuming that one first time element at least partially overlaps (that is, partially overlaps or entirely overlaps) each of at least one second time element in time domain, the terminal device may determine that a transmission direction in each of the at least one second time element does not conflict with the transmission direction in the first time element.

In a possible example, the subcarrier spacing of the first frequency domain resource is less than the subcarrier spacing of the second frequency domain resource, one first time element corresponds to (or includes) N second time elements, where N is an integer greater than 1; and step 230 may include at least one of the following two cases:

when the transmission direction in the first time element is uplink, determining, by the terminal device, that a transmission direction in the N second time elements is a non-downlink transmission direction; or when the transmission direction in the first time element is downlink, determining, by the terminal device, that a transmission direction in the N second time elements is a non-uplink transmission direction.

Figure 5:
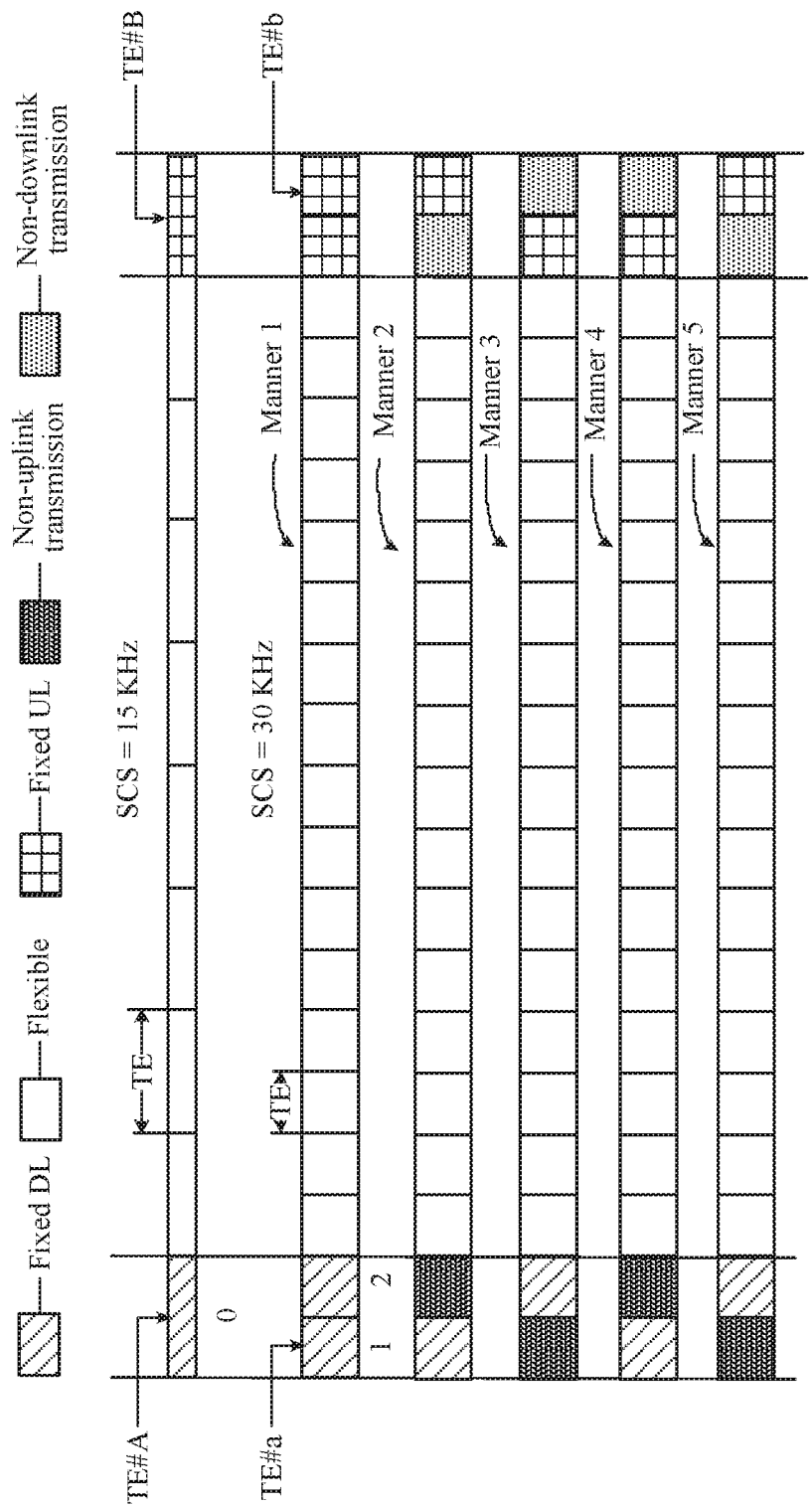
FIG. 5 is a schematic diagram of an example of a first time element and a second time element according to an embodiment of this application.

Optionally, in time domain, the first time element is aligned with the N consecutive second time elements (or start time and end time of the first time element and the N second time elements are the same). FIG. 5 is a schematic diagram of an example of the first time element and the second time element according to an embodiment of this application. As shown in FIG. 5, the subcarrier spacing of the first frequency domain resource is 15 kHz, and the subcarrier spacing of the second frequency domain resource is 30 kHz and N=2, that is, one first time element corresponds to two second time elements. For ease of description, two first time elements in FIG. 5 may be denoted as a first time element #A and a first time element #B. A second time element corresponding to the first time element #A is denoted as a second time element #a, and a second time element corresponding to the first time element #B is denoted as a second time element #b.

In an optional example, the transmission direction in the N second time elements may be the same as the transmission direction in the first time element (for example, both are uplink transmission or both are downlink transmission). As shown in Manner 1 in FIG. 5, a transmission direction in two second time elements #a is the same as a transmission direction in the first time element #A, and a transmission direction in two second time elements #b is the same as a transmission direction in the first time element #B.

In another optional example, a transmission direction in some second time elements in the N second time elements is consistent with the transmission direction in the first time element, and a transmission direction in some second time elements is limited (that is, non-downlink transmission or non-uplink transmission). For example, as shown in Manner 2, Manner 3, Manner 4, and Manner 5 in FIG. 5, a transmission direction in one of the two second time elements #a is the same as the transmission direction in the first time element #A, and a transmission direction in the other second time element #a cannot be opposite to the transmission direction in the first time element #A. Because the transmission direction in the first time element #A is downlink transmission, the transmission direction in the other second time element #a may be a transmission direction other than uplink transmission. For example, the transmission direction in the other second time element #a may be downlink transmission, empty, unknown, or reserved.

It should be noted that, in the various manners in FIG. 5, a specific manner used by the terminal device to determine the transmission direction in the second time element may be agreed on in advance or indicated by the network device. This is not limited in this embodiment of this application.

Optionally, the subcarrier spacing of the second frequency domain resource is $2^k$ times the subcarrier spacing of the first frequency domain resource, the first time element is numbered m in time domain, and a transmission direction in at least one of the $2^k$ second time elements numbered $2^k \cdot m, \ldots,$ and $(2^k \cdot m + 2^k - 1)$ is the same as the transmission direction in the first time element numbered m, where m is an integer greater than or equal to 0, and k is an integer greater than or equal to 1.

Specifically, assuming that the first time element is a fixed time element in the first time segment, the terminal device may determine, based on the transmission direction in the first time element in the first time segment, the transmission direction in the second time element in the first time segment. A time length of the first time segment may be a transmission period. A transmission period of the first time element and a transmission period of the second time element may be the same or different.

Time elements in each transmission period may be numbered from 0. Assuming that the subcarrier spacing of the second frequency domain resource is $2^k$ (k≥1) times the subcarrier spacing of the first frequency domain resource, one first time element on the first frequency domain resource corresponds to $2^k$ time elements (that is, $N=2^k$) on the second frequency domain resource. In a case in which two transmission periods are equal, in one transmission period, time elements on the first frequency domain resource are numbered 0, 1, . . . , and L, and numbers on the second frequency domain resource are 0, 1, . . . , and $2^k \cdot L$. The first time element is numbered m in time domain, the first time element numbered m is aligned with the $2^k$ second time elements numbered $2^k \cdot m, \ldots,$ and $(2^k \cdot m + 2^k - 1)$ in time domain, and a transmission direction in at least one of the $2^k$ second time elements numbered $2^k \cdot m, \ldots,$ and $(2^k \cdot m + 2^k - 1)$ is the same as that in the first time element numbered m. As shown in FIG. 5, a first time element numbered 0 corresponds to second time elements numbered 0 and 1, and a transmission direction in at least one of the second time elements numbered 0 and 1 is the same as the transmission direction in the first time element.

It should be noted that, a number (or a location) of a second time element that is in the $2^k$ second time elements numbered $2^k \cdot m, \ldots,$ and $(2^k \cdot m + 2^k - 1)$ and in which a transmission direction is the same as that in the first time element numbered m may be agreed on in advance or dynamically configured by the network device. This is not limited in this embodiment of this application.

In a possible example, the subcarrier spacing of the first frequency domain resource is greater than the subcarrier spacing of the second frequency domain resource, and one first time element corresponds to time subelements included in one second time element; and step 230 may include at least one of the following two cases:

when the transmission direction in the first time element is uplink, determining, by the terminal, that a transmission direction in the time subelements included in the second time element is a non-downlink transmission direction: or when the transmission direction in the first time element is downlink, determining, by the terminal device, that a transmission direction in the time subelements included in the second time element is a non-uplink transmission direction.

Optionally, in time domain, that one first time element corresponds to time subelements included in one second time element includes: in time domain, the first time element is aligned with the time subelements included in the second time element.

It can be learned from the foregoing description that, the second time element may be a time scheduling unit such as a subframe and a slot that includes a plurality of symbols. The time subelement may include a partial time domain resource in the second time element. In other words, the time subelement may be understood as a partial time domain resource in the second time element, and it should be understood that, one second time element may include at least two time subelements. It should be further understood that, the at least two time subelements included in the second time element may have a same time length or different time lengths. For ease of description, the time subelements included in the second time element corresponding to the first time element may be denoted as "first time subelements". For ease of description, in the accompanying drawings, the time subelement may be denoted as a "subelement, SE".

Figure 6:
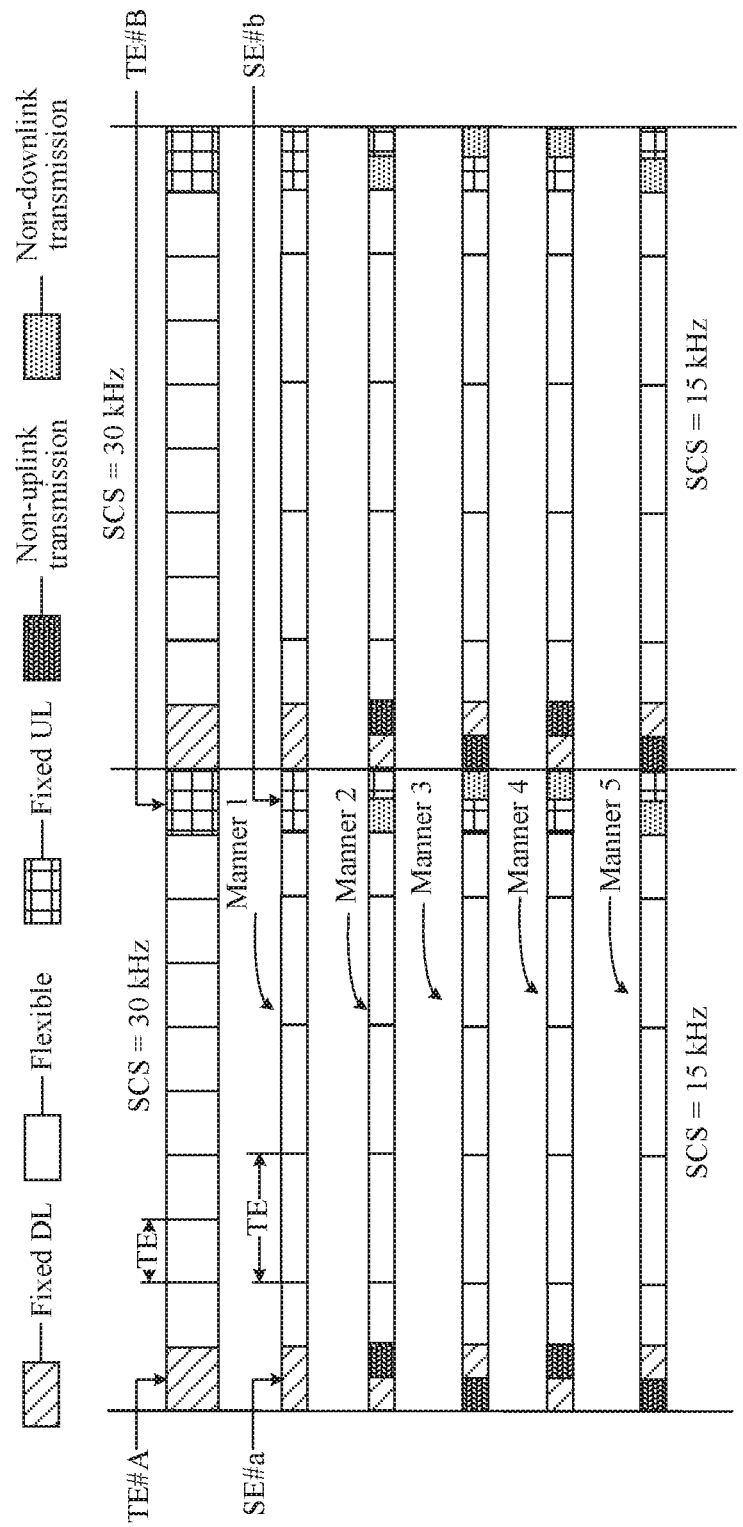
FIG. 6 is a schematic diagram of another example of a first time element and a second time element according to an embodiment of this application.

FIG. 6 is a schematic diagram of another example of the first time element and the second time element according to an embodiment of this application. As shown in FIG. 6, the subcarrier spacing of the first frequency domain resource is 30 kHz, and the subcarrier spacing of the second frequency domain resource is 15 kHz, that is, one first time element corresponds to a partial time domain resource in one second time element.

In an optional example, a transmission direction in one first time element is the same as that in a first time subelement corresponding to the first time element (for example, both are uplink or both are downlink). For ease of description, two first time elements in FIG. 6 may be denoted as a first time element #A and a first time element #B, a "first time subelement corresponding to the first time element #A" is denoted as a "first time subelement #a", and "a first time subelement corresponding to the first time element #B" is denoted as "a first time subelement #b".

In an optional example, a transmission direction in the first subelement is consistent with that in the first time element. As shown in Manner 1 in FIG. 6, a transmission direction in the first time subelement #a is the same as a transmission direction in the first time element #A. and a transmission direction in the first time subelement #b is the same as a transmission direction in the second time element #B.

In another optional example, a transmission direction in a partial time domain resource in the first time subelement is consistent with the transmission direction in the first time element, and a transmission direction in another partial time domain resource in the first time subelement is limited. For example, as shown in Manner 2, Manner 3, Manner 4, and Manner 5 in FIG. 6, a transmission direction in a partial time domain resource in the first time subelement #a is the same as the transmission direction in the first time element #A, and a transmission direction in another partial time domain resource in the first time subelement #a cannot be opposite to the transmission direction in the first time element #A. For details, refer to the related description above, and details are not described herein again.

Optionally, in this embodiment of the present invention, the method 200 may further includes the following step:

201. The network device sends second indication information to the terminal device; and correspondingly, the terminal device receives the second indication information from the network device, where the second indication information is used to indicate that the first time element is a reference time element of the second time element.

Specifically, the first time element being a reference time element of the second time element may be understood as that: the transmission direction in the first time element may be used to determine the transmission direction in the second time element.

Further, it is assumed that the network device and the terminal device transmit data over at least three resources. The network device may send the second indication information to the terminal device, and instruct the terminal device to use a specific resource that is in the at least three resources and on which a time element is used as a reference. In this case, the first indication information may be used to indicate a transmission direction in the reference time element, and the terminal device may determine the reference time element based on the second indication information and the first indication information, and determine a transmission direction in a time element on another resource based on the transmission direction in the reference time element.

In this embodiment of this application, the transmission direction in the first time element is related to the transmission direction in the second time element (that is, a transmission direction conflict cannot occur), that is, time elements on two resources are associated with each other. In other words, the network device only needs to indicate the transmission direction in the first time element, and the terminal device may determine the transmission direction in the first time element and the transmission direction in the second time element. It can be learned from the foregoing description that, the first time element may be a fixed time element, and the second time element includes a fixed time element. In other words, the network device indicates a transmission direction in a fixed time element on a resource to the terminal device, and the terminal device can determine a transmission direction in a fixed time element on each of at least two resources. According to the method, signaling overheads can be reduced, and complexity of indicating the fixed time element by the network device can be lowered.

An example of the method for determining a transmission direction in the embodiments of this application is described above, and another example of the method for determining a transmission direction in the embodiments of this application is described below with reference to FIG. 7.

Figure 7:
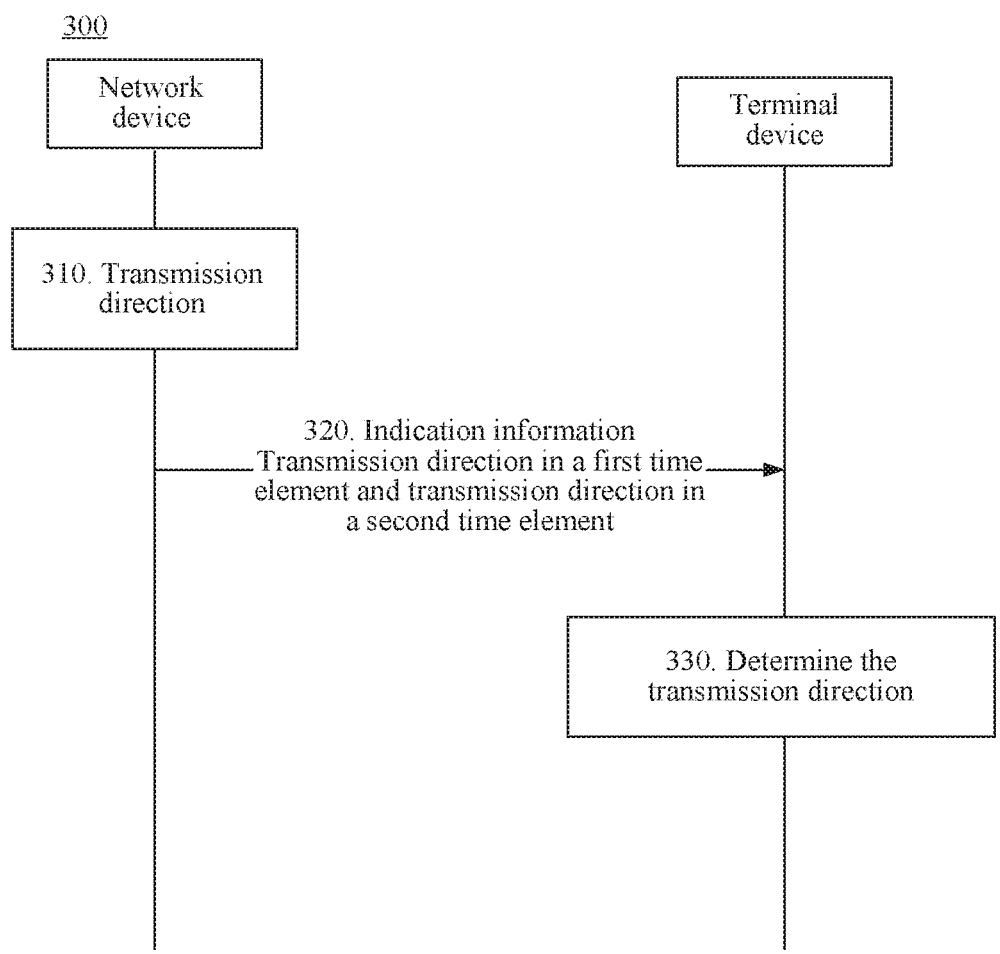
FIG. 7 is a schematic interaction diagram of another example of a method for determining a transmission direction according to an embodiment of this application.

FIG. 7 is a schematic interaction diagram of another example of the method for determining a transmission direction according to an embodiment of this application. It should be understood that, FIG. 7 shows detailed steps or operations of the method 300, but the steps or operations are merely examples. In this embodiment of this application, another operation may further be performed, or only some operations in FIG. 7 are performed.

The method 300 may be performed by a network device and a terminal device. The network device and the terminal device may correspond to the network device 101 and the terminal device 102 respectively in the foregoing communication scenario. As shown in FIG. 7, the method 300 may include 310, 320, and 330.

As shown in FIG. 7, the method may include the following steps.

310. A network device determines a transmission direction in a first time element and a transmission direction in a second time element.

Specifically, the first time element is located on a first resource, a frequency domain resource of the first resource is a first frequency domain resource, the second time element is located on a second resource, and a frequency domain resource of the second resource is a second frequency domain resource.

320. The network device sends indication information based on the transmission direction in the first time element and the transmission direction in the second time element. Correspondingly, the terminal device receives indication information sent by the network device, and the indication information is used to indicate the transmission direction in the first time element and the transmission direction in the second time element.

330. A network device determines the transmission direction in the first time element and the transmission direction in the second time element based on the indication information.

For a detailed description of the method 300, refer to the related description above, and for brevity, details are not described herein again.

It should be further understood that, a difference between the method 300 and the method 200 includes: In the method 300, the network device directly indicates the transmission direction in the first time element and the transmission direction in the second time element to the terminal device, and in the method 200, the network device indicates the transmission direction in the first time element to the terminal device, and the terminal device may determine the transmission direction in the second time element based on the transmission direction in the first time element.

In the manner provided in this embodiment of this application, if the first time element and the second time element are periodic, and a transmission period of the first time element and a transmission period of the second time element are different, the network device can avoid a conflict between the transmission direction in the first time element and the transmission direction in the second time element through a scheduling behavior.

Figure 8:
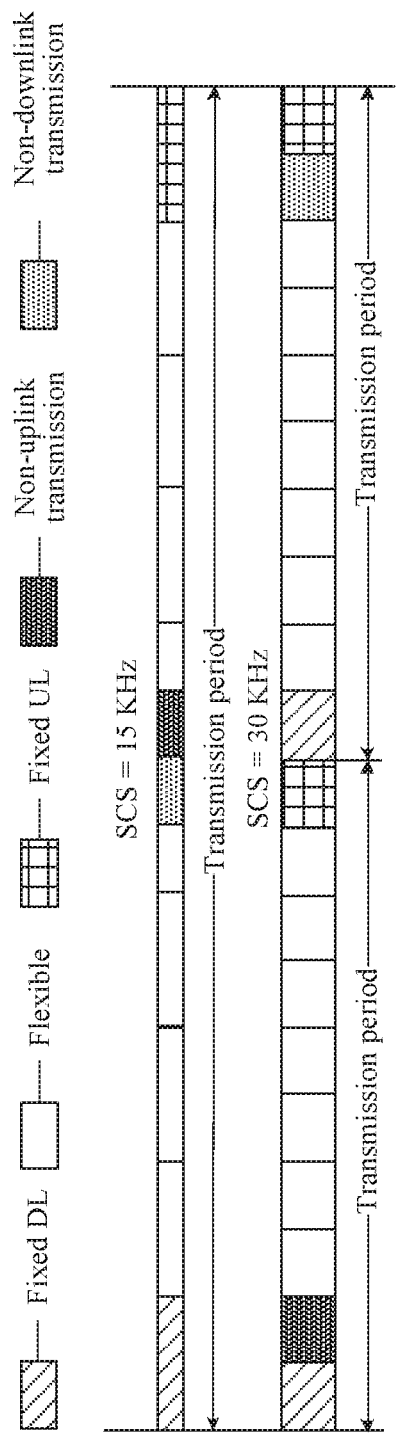
FIG. 8 is a schematic diagram of still another example of a first time element and a second time element according to an embodiment of this application.

FIG. 8 is a schematic diagram of another example of the first time element and the second time element according to an embodiment of this application. As shown in FIG. 8, the subcarrier spacing of the first frequency domain resource is 30 kHz, the subcarrier spacing of the second frequency domain resource is 15 kHz, and a time length of a transmission period of the first time element is different from a time length of a transmission period of the second time element. In this case, the network device can avoid a conflict between the transmission direction in the first time element and the transmission direction in the second time element through a scheduling behavior.

The method for determining a transmission direction in the embodiments of this application is described above with reference to FIG. 2 to FIG. 8. The device in the embodiments of this application is described below with reference to FIG. 9 to FIG. 12.

Figure 9:
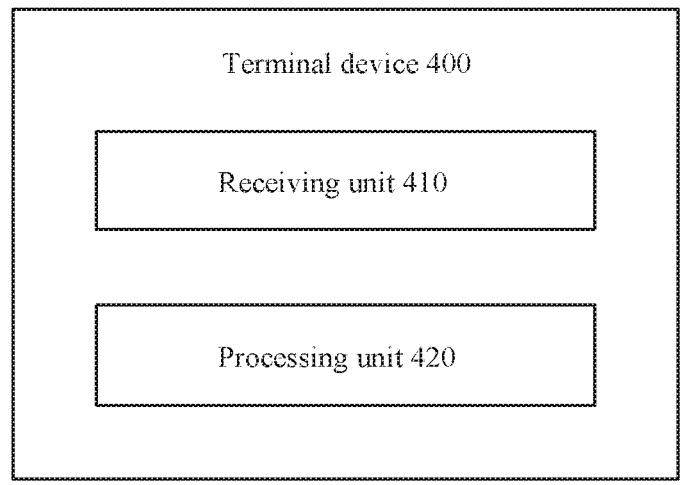
FIG. 9 is a schematic block diagram of an example of a terminal device according to an embodiment of this application.

FIG. 9 is a schematic block diagram of an example of a terminal device according to an embodiment of this application. As shown in FIG. 9, the terminal device 400 includes:

a receiving unit 410, configured to receive first indication information from a network device, where the first indication information is used to indicate a transmission direction in a first time element, the first time element is located on a first resource, and a frequency domain resource of the first resource is a first frequency domain resource; and a processing unit 420, configured to determine a transmission direction in a second time element based on the transmission direction in the first time element, where the second time element is located on a second resource, and a frequency domain resource of the second resource is a second frequency domain resource, where the first frequency domain resource and the second frequency domain resource use different configuration parameters.

Optionally, the configuration parameter includes a subcarrier spacing; and a subcarrier spacing of the first frequency domain resource is less than a subcarrier spacing of the second frequency domain resource: or a subcarrier spacing of the first frequency domain resource is greater than a subcarrier spacing of the second frequency domain resource.

Optionally, the subcarrier spacing of the first frequency domain resource is less than the subcarrier spacing of the second frequency domain resource:

one first time element corresponds to N second time elements, where N is an integer greater than 1; and the processing unit 420 is specifically configured to:

when the transmission direction in the first time element is uplink, determine that a transmission direction in the N second time elements is a non-downlink transmission direction; or when the transmission direction in the first time element is downlink, determine that a transmission direction in the N second time elements is a non-uplink transmission direction.

Optionally, that one first time element corresponds to N second time elements includes: in time domain, the first time element is aligned with the N consecutive second time elements.

Optionally, $N=2^k$, the subcarrier spacing of the second frequency domain resource is $2^k$ times the subcarrier spacing of the first frequency domain resource, the first time element is numbered m in time domain, and a transmission direction in at least one of the $2^k$ second time elements numbered $2^k \cdot m, \ldots,$ and $(2^k \cdot m + 2^k - 1)$ is the same as the transmission direction in the first time element numbered m, where m is an integer greater than or equal to 0, and k is an integer greater than or equal to 1.

Optionally, the subcarrier spacing of the first frequency domain resource is greater than the subcarrier spacing of the second frequency domain resource:

one first time element corresponds to time subelements included in one second time element, and the processing unit 420 is specifically configured to:

when the transmission direction in the first time element is uplink, determine that a transmission direction in the time subelements included in the one second time element is a non-downlink transmission direction; or when the transmission direction in the first time element is downlink, determine that a transmission direction in the time subelements included in the one second time element is a non-uplink transmission direction.

Optionally, that one first time element corresponds to time subelements included in one second time element includes: in time domain, the first time element is aligned with the time subelements included in the second time element.

Optionally, the receiving unit 410 is further configured to: receive second indication information sent by the network device, where the second indication information is used to indicate that the first time element is a reference time element of the second time element.

Optionally, the first frequency domain resource and the second frequency domain resource are located on different bandwidth parts BP, or located on different carriers in intra-band carrier aggregation CA.

It should be understood that, the various units and other operations or functions described above in the terminal device 400 provided in this embodiment of this application are for the purpose of implementing corresponding procedures performed by the terminal device in the method 200 (or the method 300) for determining a transmission direction in the embodiments of this application. For brevity, details are not described herein again.

Figure 10:
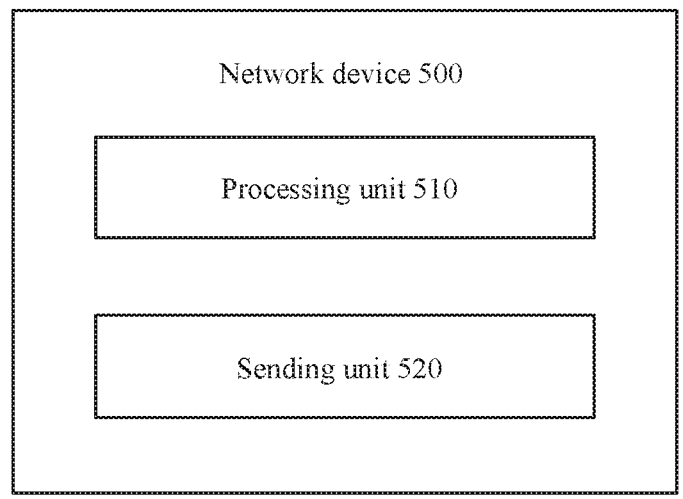
FIG. 10 is a schematic block diagram of an example of a network device according to an embodiment of this application.

FIG. 10 is a schematic block diagram of an example of a network device according to an embodiment of this application. As shown in FIG. 10, the network device 500 includes:

a processing unit 510, configured to determine a transmission direction in a first time element and a transmission direction in a second time element, where the first time element is located on a first resource, a frequency domain resource of the first resource is a first frequency domain resource, the second time element is located on a second resource, and a frequency domain resource of the second resource is a second frequency domain resource; and a sending unit 520, configured to send first indication information to a terminal device, where the first indication information is used to indicate the transmission direction in the first time element, where the first frequency domain resource and the second frequency domain resource use different configuration parameters.

Optionally, the configuration parameter includes a subcarrier spacing; and a subcarrier spacing of the first frequency domain resource is less than a subcarrier spacing of the second frequency domain resource; or a subcarrier spacing of the first frequency domain resource is greater than a subcarrier spacing of the second frequency domain resource.

Optionally, the subcarrier spacing of the first frequency domain resource is less than the subcarrier spacing of the second frequency domain resource;

one first time element corresponds to N second time elements, where N is an integer greater than 1; and when the transmission direction in the first time element is uplink, a transmission direction in the N second time elements is a non-downlink transmission direction; or when the transmission direction in the first time element is downlink, a transmission direction in the N second time elements is a non-uplink transmission direction.

Optionally, that one first time element corresponds to N second time elements includes: in time domain, the first time element is aligned with the N consecutive second time elements.

Optionally, $N=2^k$, the subcarrier spacing of the second frequency domain resource is $2^k$ times the subcarrier spacing of the first frequency domain resource, the first time element is numbered m in time domain, and a transmission direction in at least one of the $2^k$ second time elements numbered $2^k \cdot m, \ldots$ and $(2^k \cdot m+2^k-1)$ is the same as the transmission direction in the first time element numbered m, where m is an integer greater than or equal to 0, and k is an integer greater than or equal to 1.

Optionally, the subcarrier spacing of the first frequency domain resource is greater than the subcarrier spacing of the second frequency domain resource;

one first time element corresponds to time subelements included in one second time element, and when the transmission direction in the first time element is uplink, a transmission direction in the time subelements included in the one second time element is a non-downlink transmission direction; or when the transmission direction in the first time element is downlink, a transmission direction in the time subelements included in the one second time element is a non-uplink transmission direction.

Optionally, that one first time element corresponds to time subelements included in one second time element includes: in time domain, the first time element is aligned with the time subelements included in the second time element.

Optionally, the sending unit 520 is further configured to send second indication information, where the second indication information is used to indicate that the first time element is a reference time element of the second time element.

Optionally, the first frequency domain resource and the second frequency domain resource are located on different bandwidth parts BP, or located on different carriers in intra-band carrier aggregation CA.

It should be understood that, the various units and other operations or functions described above in the network device 500 provided in this embodiment of this application are for the purpose of implementing corresponding procedures performed by the network device in the method 200 (or the method 300) for determining a transmission direction in the embodiments of this application. For brevity, details are not described herein again.

Figure 11:
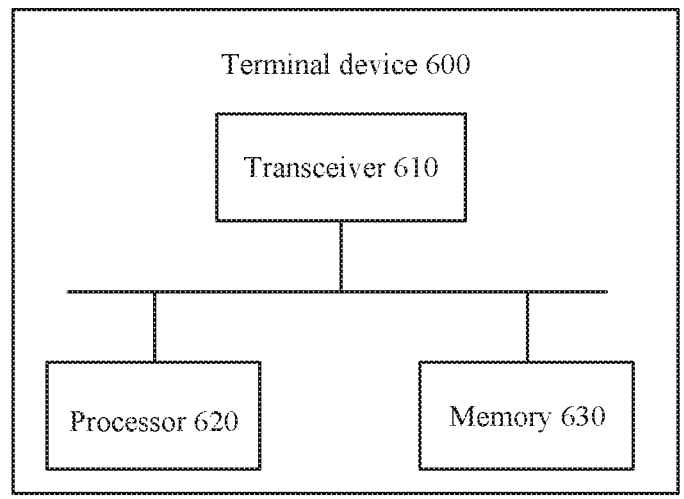
FIG. 11 is a schematic block diagram of another example of a terminal device according to an embodiment of this application.

FIG. 11 is a schematic block diagram of another example of a terminal device according to an embodiment of this application. As shown in FIG. 11, the terminal device 600 includes a transceiver 610 and a processor 620. The processor 620 is configured to support the terminal device in performing the function corresponding to the terminal device in the foregoing methods. Optionally, the terminal device 600 may further include a memory 630, and the memory 630 is configured to be coupled to the processor 620, and store necessary program instructions and data of the terminal device 600. The processor 620 is specifically configured to execute the instructions stored in the memory 630, and when the instructions are executed, the terminal device performs the methods performed by the terminal device in the foregoing methods.

It should be noted that, the terminal device 400 in FIG. 9 may be implemented by using the terminal device 600 in FIG. 11. For example, the receiving unit 410 in FIG. 9 may be implemented by using a transceiver 610, and the processing unit may be implemented by using the processor 620.

Figure 12:
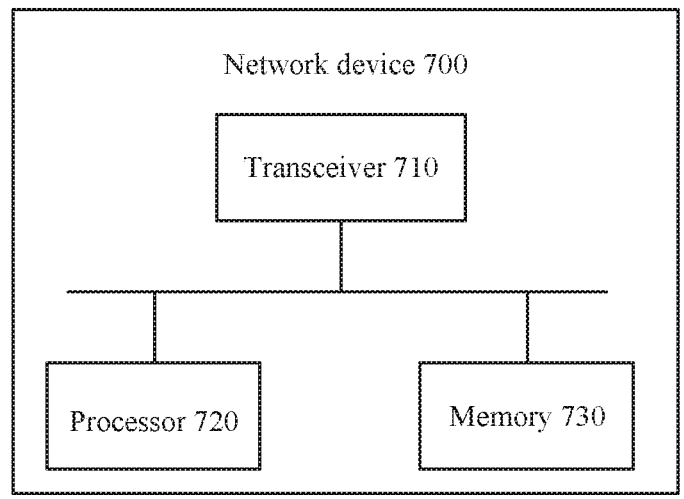
FIG. 12 is a schematic block diagram of another example of a network device according to an embodiment of this application.

FIG. 12 is a schematic block diagram of another example of a network device according to an embodiment of this application. As shown in FIG. 12, the network device 700 includes a transceiver 710 and a processor 720. The processor 720 is configured to support the network device in performing the function corresponding to the network device in the foregoing methods. Optionally, the network device may further include a memory 730, and the memory 730 is configured to be coupled to the processor 720, and store necessary program instructions and data of the network device. The processor 720 is specifically configured to execute the instructions stored in the memory 730, and when the instructions are executed, the network device performs the methods performed by the network device in the foregoing methods.

It should be noted that, the network device 500 in FIG. 10 may be implemented by using the network device 700 in FIG. 12. For example, the sending unit 520 in FIG. 10 may be implemented by using a transceiver 710, and the processing unit 510 may be implemented by using the processor 720.

It should be noted that, the method and device for determining a transmission direction in the embodiments of this application are described in this application by using the terminal device and the network device as an example. It should be understood that, the method for determining a transmission direction in the embodiments of this application may alternatively be implemented by using two baseband chips. A first baseband chip in the two baseband chips is configured to implement a related operation of the terminal device in the embodiments of this application, and a second baseband chip in the two baseband chips is configured to implement a related operation of the network device in the embodiments of this application.

It should be further noted that, an input/output circuit of the first baseband chip can be configured to implement a related operation of the transceiver of the terminal device in the foregoing description, and an input/output circuit of the second baseband chip can be configured to implement a related operation of the transceiver of the network device in the foregoing description.

It should be understood that, in this embodiment of this application, the processor may be a central processing unit (central processing unit, CPU), or the processor may be another general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like.

It may be further understood that the memory in the embodiments of this application may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory. RAM), and is used as an external cache. Through example but not limitative description, many forms of random access memories (Random Access Memory, RAM) may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM).

All or some of the foregoing embodiments may be implemented through software, hardware, firmware, or any combination thereof. When software is used to implement the embodiments, the foregoing embodiments may be implemented fully or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium, or the like. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a transmission direction, wherein the method comprises:
    receiving, by a terminal device, first indication information from a network device, wherein the first indication information is used to indicate a transmission direction in a first time element, wherein the first time element is located on a first resource, and wherein a frequency domain resource of the first resource is a first frequency domain resource; and
    determining, by the terminal device, a transmission direction in a second time element based on the transmission direction in the first time element, wherein the second time element is located on a second resource, wherein a frequency domain resource of the second resource is a second frequency domain resource, wherein the first frequency domain resource and the second frequency domain resource use different configuration parameters, and wherein, when one first time element corresponds to N second time elements, wherein N is an integer greater than 1, determining the transmission direction comprises:
        when the transmission direction in the first time element is uplink, determining, by the terminal device, that a transmission direction in the N second time elements is a non-downlink transmission direction; or when the transmission direction in the first time element is downlink, determining, by the terminal device, that a transmission direction in the N second time elements is a non-uplink transmission direction.

2. The method according to claim 1, wherein:
each of the different configuration parameters comprises a subcarrier spacing; and
a subcarrier spacing of the first frequency domain resource is less than a subcarrier spacing of the second frequency domain resource; or
a subcarrier spacing of the first frequency domain resource is greater than a subcarrier spacing of the second frequency domain resource.

3. The method according to claim 2, wherein:
when the subcarrier spacing of the first frequency domain resource is less than the subcarrier spacing of the second frequency domain resource, one first time element corresponds to N second time elements.

4. The method according to claim 2, wherein:
when the subcarrier spacing of the first frequency domain resource is greater than the subcarrier spacing of the second frequency domain resource, one first time element corresponds to one time subelement comprised in one second time element; and
the determining, by the terminal device, a transmission direction in a second time element based on the transmission direction in the first time element comprises:
when the transmission direction in the first time element is uplink, determining, by the terminal device, that a transmission direction in the time subelement comprised in the second time element is a non-downlink transmission direction; or
when the transmission direction in the first time element is downlink, determining, by the terminal device, that a transmission direction in the time subelement comprised in the second time element is a non-uplink transmission direction.

5. The method according to claim 4, wherein in time domain, the first time element is aligned with the time subelement comprised in the second time element.

6. A method for determining a transmission direction, wherein the method comprises:
determining, by a network device, a transmission direction in a first time element and a transmission direction in a second time element, wherein the first time element is located on a first resource, wherein a frequency domain resource of the first resource is a first frequency domain resource, wherein the second time element is located on a second resource, and wherein a frequency domain resource of the second resource is a second frequency domain resource; and
sending, by the network device, first indication information to a terminal device, wherein the first indication information is used to indicate the transmission direction in the first time element, wherein the first frequency domain resource and the second frequency domain resource use different configuration parameters, and wherein, when one first time element corresponds to N second time elements, wherein N is an integer greater than 1:
when the transmission direction in the first time element is uplink, a transmission direction in the N second time elements is a non-downlink transmission direction; or when the transmission direction in the first time element is downlink, a transmission direction in the N second time elements is a non-uplink transmission direction.

7. The method according to claim 6, wherein:
each of the different configuration parameters comprises a subcarrier spacing; and
a subcarrier spacing of the first frequency domain resource is less than a subcarrier spacing of the second frequency domain resource; or
a subcarrier spacing of the first frequency domain resource is greater than a subcarrier spacing of the second frequency domain resource.

8. The method according to claim 7, wherein:
when the subcarrier spacing of the first frequency domain resource is less than the subcarrier spacing of the second frequency domain resource, one first time element corresponds to N second time elements, wherein N is an integer greater than 1.

9. The method according to claim 7, wherein:
when the subcarrier spacing of the first frequency domain resource is greater than the subcarrier spacing of the second frequency domain resource, one first time element corresponds to one time subelement comprised in one second time element; and
when the transmission direction in the first time element is uplink, a transmission direction in the time subelement comprised in the second time element is a non-downlink transmission direction; or
when the transmission direction in the first time element is downlink, a transmission direction in the time subelement comprised in the second time element is a non-uplink transmission direction.

10. The method according to claim 9, wherein in time domain, the first time element is aligned with the time subelement comprised in the second time element.

11. A device, wherein the device comprises:
a memory storing instructions; and
at least one processor coupled to the memory to execute the instructions to:
receive first indication information from a network device, wherein the first indication information is used to indicate a transmission direction in a first time element, wherein the first time element is located on a first resource, and wherein a frequency domain resource of the first resource is a first frequency domain resource; and
determine a transmission direction in a second time element based on the transmission direction in the first time element, wherein the second time element is located on a second resource, wherein a frequency domain resource of the second resource is a second frequency domain resource, wherein the first frequency domain resource and the second frequency domain resource use different configuration parameters, and wherein, when one first time element corresponds to one time subelement comprised in one second time element, determining the transmission direction comprises:
when the transmission direction in the first time element is uplink, determining that a transmission direction in the time subelement comprised in the second time element is a non-downlink transmission direction; or
when the transmission direction in the first time element is downlink, determining that a transmission direction in the time subelement comprised in the second time element is a non-uplink transmission direction.

12. The device according to claim 11, wherein:
each of the different configuration parameters comprises a subcarrier spacing; and
a subcarrier spacing of the first frequency domain resource is less than a subcarrier spacing of the second frequency domain resource; or
a subcarrier spacing of the first frequency domain resource is greater than a subcarrier spacing of the second frequency domain resource.

13. The device according to claim 12, wherein:
when the subcarrier spacing of the first frequency domain resource is less than the subcarrier spacing of the second frequency domain resource, one first time element corresponds to N second time elements, wherein N is an integer greater than 1; and
the at least one processor executes the instructions to determine a transmission direction in a second time element based on the transmission direction in the first time element comprises:
when the transmission direction in the first time element is uplink, determine that a transmission direction in the N second time elements is a non-downlink transmission direction; or
when the transmission direction in the first time element is downlink, determine that a transmission direction in the N second time elements is a non-uplink transmission direction.

14. The device according to claim 12, wherein:
when the subcarrier spacing of the first frequency domain resource is greater than the subcarrier spacing of the second frequency domain resource, one first time element corresponds to one time subelement comprised in one second time element.

15. The device according to claim 14, wherein in time domain, the first time element is aligned with the time subelement comprised in the second time element.

16. A device for determining a transmission direction, wherein the device comprises:
a memory storing instructions; and
at least one processor coupled to the memory to execute the instructions to:
determine a transmission direction in a first time element and a transmission direction in a second time element, wherein the first time element is located on a first resource, wherein a frequency domain resource of the first resource is a first frequency domain resource, wherein the second time element is located on a second resource, and wherein a frequency domain resource of the second resource is a second frequency domain resource; and
send first indication information to a terminal device, wherein the first indication information is used to indicate the transmission direction in the first time element, wherein the first frequency domain resource and the second frequency domain resource use different configuration parameters, and wherein, when one first time element corresponds to one time subelement comprised in one second time element:
when the transmission direction in the first time element is uplink, a transmission direction in the time subelement comprised in the second time element is a non-downlink transmission direction; or
when the transmission direction in the first time element is downlink, a transmission direction in the time subelement comprised in the second time element is a non-uplink transmission direction.

17. The device according to claim 16, wherein:
each of the different configuration parameters comprises a subcarrier spacing; and
a subcarrier spacing of the first frequency domain resource is less than a subcarrier spacing of the second frequency domain resource; or
a subcarrier spacing of the first frequency domain resource is greater than a subcarrier spacing of the second frequency domain resource.

18. The device according to claim 17, wherein:
when the subcarrier spacing of the first frequency domain resource is less than the subcarrier spacing of the second frequency domain resource, one first time element corresponds to N second time elements, wherein N is an integer greater than 1; and
when the transmission direction in the first time element is uplink, a transmission direction in the N second time elements is a non-downlink transmission direction; or
when the transmission direction in the first time element is downlink, a transmission direction in the N second time elements is a non-uplink transmission direction.

19. The device according to claim 17, wherein:
when the subcarrier spacing of the first frequency domain resource is greater than the subcarrier spacing of the second frequency domain resource, one first time element corresponds to one time subelement comprised in one second time element.

20. The device according to claim 19, wherein in time domain, the first time element is aligned with the time subelement comprised in the second time element.

* * * * *